United States Patent
Demange et al.

(10) Patent No.: US 10,974,427 B2
(45) Date of Patent: Apr. 13, 2021

(54) METHOD FOR PRODUCING A VEHICLE PART CONSISTING OF A POLYMER MATERIAL

(71) Applicant: COMPAGNIE PLASTIC OMNIUM, Lyons (FR)

(72) Inventors: Jean-Yves Demange, Amberieu en Bugey (FR); David Tresse, Saint-André de Corcy (FR); Jérôme Brizin, Arbent (FR)

(73) Assignee: Compagnie Plastic Omnium, Lyons (FR)

(*) Notice: Subject to any disclaimer, the term of this patent is extended or adjusted under 35 U.S.C. 154(b) by 434 days.

(21) Appl. No.: 15/528,221

(22) PCT Filed: Nov. 20, 2015

(86) PCT No.: PCT/FR2015/053155
§ 371 (c)(1),
(2) Date: May 19, 2017

(87) PCT Pub. No.: WO2016/079450
PCT Pub. Date: May 26, 2016

(65) Prior Publication Data
US 2017/0312964 A1     Nov. 2, 2017

(30) Foreign Application Priority Data
Nov. 21, 2014  (FR) ...................................... 14 61304

(51) Int. Cl.
*B29C 45/38* (2006.01)
*B29C 45/27* (2006.01)
(Continued)

(52) U.S. Cl.
CPC ........ *B29C 45/382* (2013.01); *B29C 45/0025* (2013.01); *B29C 45/2708* (2013.01); *B29K 2023/10* (2013.01); *B29L 2031/3058* (2013.01)

(58) Field of Classification Search
CPC . B29C 45/38; B29C 45/382; B29C 2045/384; B29C 45/40; B29C 39/30;
(Continued)

(56) References Cited

U.S. PATENT DOCUMENTS

| | | | |
|---|---|---|---|
| 5,334,340 A | 8/1994 | Zushi | ............................ 264/161 |
| 5,967,637 A | 10/1999 | Ishikawa et al. | ............... 362/31 |

(Continued)

FOREIGN PATENT DOCUMENTS

| | | |
|---|---|---|
| CN | 101311619 A | 11/2008 |
| CN | 201284971 Y | 8/2009 |

(Continued)

OTHER PUBLICATIONS

Handbook of Rubber Industry, ISBN 7-5025-1375-2 (1994) with explanation of relevance.

*Primary Examiner* — Stella K Yi
(74) *Attorney, Agent, or Firm* — Venable LLP (57) ABSTRACT

A method for producing a part consisting of a polymer material involves injection-moulding said polymer material in a mould comprising a main section for forming the part and an additional section for forming an add-on for the part. The additional section is arranged between the injection point and the main section. The part and the add-on are separated by cutting.

6 Claims, 4 Drawing Sheets

(51) Int. Cl.
*B29C 45/00* (2006.01)
*B29K 23/00* (2006.01)
*B29L 31/30* (2006.01)

(58) Field of Classification Search
CPC . B29C 41/383; B29C 43/40; B29C 2043/406;
B29C 2043/464; B29C 2045/1693; B29C
48/0022; B29C 2049/2437; B29C 49/50;
B29C 2049/5848; B29C 51/306; B29C
53/8091; B29C 69/005; B29C 60/001;
B29D 3/08
See application file for complete search history.

(56) References Cited

U.S. PATENT DOCUMENTS

| | | | |
|---|---|---|---|
| 7,807,226 B2 | 10/2010 | Jensen et al. | 427/256 |
| 2001/0007513 A1 | 7/2001 | Koshimizu et al. | 359/811 |
| 2006/0163760 A1 | 7/2006 | Jensen et al. | 264/1.31 |
| 2010/0327491 A1 | 12/2010 | Nagashima | 264/328.1 |
| 2011/0026268 A1 | 2/2011 | Omura et al. | 362/548 |

FOREIGN PATENT DOCUMENTS

| | | |
|---|---|---|
| DE | 10 2010 017 254 A1 | 1/2011 |
| EP | 2 279 844 A2 | 2/2011 |
| JP | 55-133942 A | 10/1980 |
| JP | 3-96310 A | 4/1991 |
| JP | 4-59217 A | 2/1992 |
| JP | 2003-305753 A | 10/2003 |
| WO | 2006/050230 A2 | 5/2006 |

METHOD FOR PRODUCING A VEHICLE PART CONSISTING OF A POLYMER MATERIAL

FIELD OF THE INVENTION

This invention relates to loaded or non-loaded polypropylene type thermoplastic parts. It applies in particular to parts having visible surfaces after assembly on a vehicle.

BACKGROUND OF THE INVENTION

In a conventional moulding method, the material is not injected directly into the cavity but first passes through a channel which forms a constriction with respect to the mould, since its thickness is smaller than that of the mould. The wide channels form "layers" and the narrow channels form "thresholds".

Generally, appearance defects are encountered on the first 30 millimetres (decreasing defects) of flow of material into the cavity. The main defect encountered is the hot spot related to shear and to the initial filling disturbance downstream from the constriction, generating significant shrinkage and possibly causing the part to be scrapped.

Consequently, the surfaces of the part where the injection took place have a defect which makes them unacceptable as visible surfaces. A visible surface of a part means a surface that is seen by an observer of adult height standing next to the vehicle and which meets the appearance requirements specified in the automotive field. Although these requirements may vary from one manufacturer to another, all manufacturers agree that a visible surface of a part must have as few defects as possible that can be detected with the naked eye.

There is therefore a need for parts having some surfaces which must be visible.

Figure 1A:
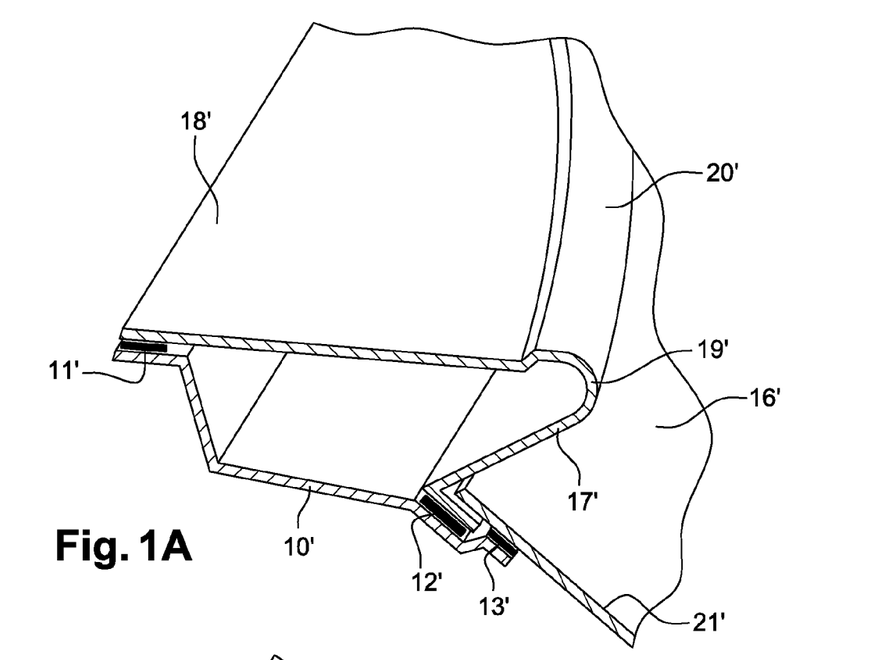
FIG. 1A shows a part which forms an entire spoiler with a U-shaped portion according to the state of the art.
Figure 1B:
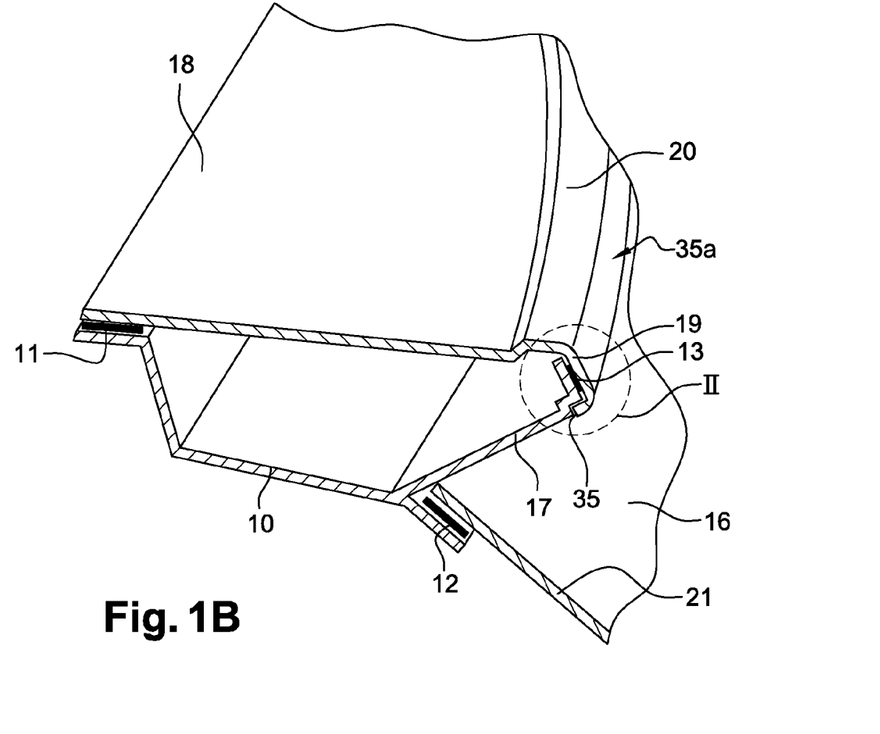
FIG. 1B shows a part which forms the upper section of the same spoiler.

In the automotive field, this is for example the case of the upper region of the spoiler (without lower return forming an integrated cap) which is shown on FIG. 1B. Spoilers usually have a U-shaped portion, as shown on FIG. 1A, with a long lower return which may be up to 100 mm long. However, spoilers such as those shown on FIG. 1B have a lower return which is only a few millimetres long (3 mm to 10 mm).

A material that can be used to make parts not having such appearance defects is already known. It is ABS/PC (acrylonitrile butadiene styrene/polycarbonate). This material is however characterised by the fact that it expands considerably. It also requires specific treatment (flaming operation) before bonding and requires a specific paint primer. Lastly, it is an expensive material.

SUMMARY OF THE INVENTION

The main purpose of the invention is to propose a part having some surfaces which may be visible.

The invention therefore relates to a method for obtaining a motor vehicle part having at least one visible surface extending up to a portion of an edge of the part, the part being formed by a skin of a polymer material whose thickness is significantly smaller than the other dimensions of the skin, method characterised in that it comprises at least the following steps:

injecting the polymer material into a mould comprising a cavity in at least two contiguous sections, i.e. a main section for forming the part and at least one additional section for forming an add-on for the part, the additional section extending over a length ranging from 10 mm to 30 mm, preferably from 20 mm to 28 mm, and ideally from 20 mm to 25 mm, the thickness of each additional section at the junction with the main section being at most equal to the thickness at the junction of the main section and at least equal to the thickness at the junction of the main section decreased by 0.5 mm, each additional section being arranged between an entry point of the polymer material into the cavity and the main section, and separating the part and the add-on by cutting to form said portion of an edge of the part.

In this case, the "length" of an object moulded in a cavity means a measurement taken on this object in the direction of flow of the material into the cavity. Thus, the length of the add-on is the measurement taken along the curvature, where applicable, of the add-on, in the direction of filling of the additional section of the cavity. Similarly, the length of the part is the measurement taken following, where applicable, the curvature of the part in the direction of filling of the main section of the cavity. The width is a measurement taken perpendicular to the length.

In this case, the "portion of an edge of the part" means the portion of its contour obtained by cutting.

The invention will be advantageously applied to parts having a width of 500 mm to 1000 mm, preferably 200 mm to 400 mm, a length of 1000 mm to 1500 mm and a thickness of 2 mm to 5 mm, the thickness preferably being between 3 mm to 3.5 mm. Advantageously, the width of these parts is equal to one third of the length. The width of the add-on may vary between 45 mm and the entire width of the part.

The add-ons are in fact local elongations, also referred to as "extensions", of the thermoplastic part injected in the edge of the part. These add-ons are intended to receive the usual defects encountered on the first millimetres of flow of polymer material into the cavity.

These add-ons are intended to be separated from the part.

Before separation, however, these add-ons could advantageously be used to hang the part, for example during its transport along the paint line.

After separation, the polymer material contained in the add-on is advantageously reused to manufacture new parts.

Advantageously, cutting is carried out with a position tolerance with respect to the junction of less than 0.5 mm and the cut obtained has no bead and no roughness.

Preferably, the edge portion is visible.

The quality of the cut is sufficient to reach the quality level expected in the automotive field, i.e. a clean cut with no bead and no roughness.

Advantageously, the method for obtaining a part comprises the following steps:

creating an incipient break at the junction between the part and the add-on and reducing the temperature of the junction to a temperature less than or equal to the embrittlement point of the polymer material, then once the temperature of the junction between the part and the add-on is less than or equal to the embrittlement point of the polymer material, mechanical breakage at the junction.

An "incipient break" means a weakened area whose presence locally weakens the assembly of part and the add-on, thereby facilitating cutting. The incipient break may correspond to a thickness less than the thickness of the part. It may also correspond to an area with holes drilled through in places.

These steps of the method consist in reducing the temperature at the incipient break to an embrittlement temperature (embrittlement point) of the thermoplastic material. A force is then applied to stress the incipient break. The combination of this force and the reduction of temperature down to the embrittlement point causes breakage of the junction and separation of the part and the add-on.

These steps of the method exhibit good positioning tolerance with respect to the junction (less than 0.5 mm) and produce a part with a clean appearance at the visible edge cut off. The cut obtained is therefore precise. It can be carried out before or after painting. These steps of the method do not produce chips, burnt materials or ash.

These steps of the method can be used for add-ons of width 500 mm to 1000 mm. This cutting system can therefore be considered for very wide parts.

The temperature of the junction between the part and the add-on can be reduced by placing the assembly of the part and the add-on in a closed chamber containing a conditioning atmosphere at a temperature less than or equal to the embrittlement point of the polymer material. The assembly can also be placed in a cooling tunnel allowing the part to go through on a conveyor of a part production line.

The temperature of the junction between the part and the add-on can also be reduced by immersing the junction in a liquid nitrogen bath, or by spraying (projection of carbon dioxide crystals or liquid nitrogen).

The mechanical break can be made by subjecting the add-on to a continuous force using a hydraulic cylinder or a gripper or to a sudden force by a falling mass. Intervention of an operator may be considered.

In the method according to this embodiment of the invention, the phase of creating an incipient break may be before or after the phase of reducing the temperature.

Advantageously, cooling is carried out only on the junction, on an assembly of a part and an add-on in which the part is still hot (10 to 50° C.). This guarantees that only the junction will yield.

Optionally, the add-on is also subjected to a temperature less than or equal to the embrittlement point of the polymer material.

This method could also be implemented for degating.

Optionally, the step of creating an incipient break at the junction between the part and the add-on consists in forming a sharp angle at the surface of the junction.

A "sharp angle" means an edge or groove whose cross-section has a crest of radius of curvature less than 0.5 mm, ideally less than 0.05 mm.

Thus, the sharp angle can be formed by creating, at the junction between the part and the add-on, a groove using a blade after ejecting the part and the add-on from the mould. The sharp angle is in this case the angle at the bottom of the groove.

Advantageously, the depth of the groove is between 0.2 mm and 0.3 mm.

The sharp angle can also be formed during the injection step, by using a cavity in which the thickness at the junction of the additional section is less, preferably by 0.5 mm, than the thickness at the junction of the main section, by forming a step at the junction between the part and the add-on.

Preferably, cutting is carried out with a position tolerance with respect to the junction of less than or equal to 0.1 mm and the cut obtained has no bead and no roughness.

Also advantageously, cutting is carried out using a blade movable in translation in a cutting direction which has a sharp end at least partially inclined, i.e. not perpendicular to the cutting direction and which is arranged to separate the assembly of the part and the add-on along the junction between them, under the effect of a downward pressure.

The inclination of the sharp end of the blade concentrates all the force exerted on the blade on a reduced contact line, which increases the cutting efficiency. The specific shape of the cutting blade helps to guide it as it moves down in contact with the part to be cut.

This cutting method is simple and produces a part with a clean appearance at the visible edge cut. It can be used for add-ons of width 500 mm to 1000 mm. This cutting system can therefore be considered for very wide parts. In addition, it has a maximum position tolerance with respect to the junction of 0.1 mm. This system can be used to index the part to be cut locally for the cut. The part can protect the operator from the cutting area, which simplifies the safety systems. In addition, this method requires a specific but inexpensive device. This method is also characterised by a very short cycle time that follows perfectly an injection rate. Finally, this cut can be made before or after painting and these steps of the method do not produce chips, burnt materials or ash.

Advantageously, the sharp end at least partially inclined consists of three segments, i.e. one central segment and two side segments which each intersect an edge of the blade and each of the side segments forms an acute angle with the cutting direction.

Advantageously, the side segments are symmetrical.

In an advantageous embodiment, the system can operate automatically.

This method can also be implemented for degating.

These cutting techniques are preferred over other techniques which have the disadvantages described below.

Thus, with the mechanical cutting techniques (cutting pliers, drawn knives, ultrasonic slicing), the force causes the plastic to flow, which generates a small bead along the cut. In addition, the cutting tolerance is at best 0.5 mm for a drawn knife. It is greater than 0.5 mm for cutting pliers. In addition, the drawn knife cutting system is poorly adapted for following a curved cut. Moreover, cutting techniques using cutting pliers or drawn knives are not suitable for cutting add-ons of width greater than 200 mm. Thus, the appearance of the parts and the cutting precision are not compatible with the purpose of the invention.

Cutting by high-pressure water jet creates a rough cut. Moreover, when cutting closed sections, it requires the use of a protective shield (sacrificial part).

Laser cutting could be considered, both in terms of appearance (quality of the cut edge) and cutting precision. It is an expensive solution, however. The parts must be cleaned after cutting and the method may cause pollution if any paint treatment residues remain. In addition, in case of closed sections, a minimum distance, or the use of a copper or silver beam absorption heat shield, or a protective shield (sacrificial part is required to avoid cutting the second surface located opposite the cut where the laser beam comes out.

The invention also relates to a method for obtaining an assembly of a motor vehicle part and a frame supporting the part, the part having at least one visible surface extending up to an edge of the part, the method being characterised in that it comprises the steps of the method for obtaining a motor vehicle part as described above, and in addition a step of assembling the skin on the frame supporting the part.

In the assembly obtained by the method according to the invention, the part has at least one visible surface after mounting the assembly on the vehicle.

Preferably, the part and the frame are assembled by bonding.

The assembly obtained by the method is advantageously an assembly of a supporting frame and an external bodywork part.

Preferably, the external bodywork part is a rear spoiler.

BRIEF DESCRIPTION OF THE FIGURES

The invention will be better understood on reading the accompanying figures, which are given solely by way of example and not limiting in any way, in which.

DETAILED DESCRIPTION

We now refer to FIG. 1A, which shows a part 20' forming an entire spoiler according to the state of the art. The part 20' comprises an upper portion 18' and a U-shaped portion 19' which includes a cap 17'. The part 20' is mounted on a frame 10' of an opening element using a bead of glue 11' which bonds the portion 18' of the part 20' to the frame 10' of the opening element and a bead of glue 12' which bonds the U-shaped portion 19' to the frame 10' of the opening element. The assembly is assembled with the glass, of which a portion 16' is shown. More precisely, the section 21' of the glass 16' is bonded to the cap 17' by a bead of glue 13'.

FIG. 1B shows a part 20 which forms the upper section of a spoiler having a generally identical shape. The part 20 comprises a curved portion 19 and an upper portion 18. It is mounted on a frame 10 of an opening element which includes a cap 17. The part 20 is mounted on the frame 10 of an opening element using a bead of glue 11 which bonds the portion 18 of the part 20 to the frame 10 of the opening element and a bead of glue 13 which bonds the cap 17 of the frame 10 of the opening element to the curved portion 19 of the part 20. The assembly is assembled with the glass, of which a portion 16' is shown, using a bead of glue 12, which bonds an upright 21 of the glass to the frame 10 of the opening element.

Figure 2:
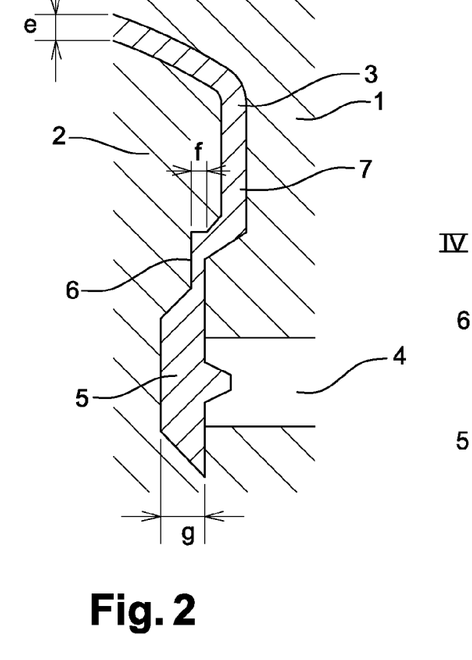
FIG. 2 is a cross-sectional view of a portion of a mould according to the state of the art, in region II of the part shown on FIG. 1B.
Figure 3:
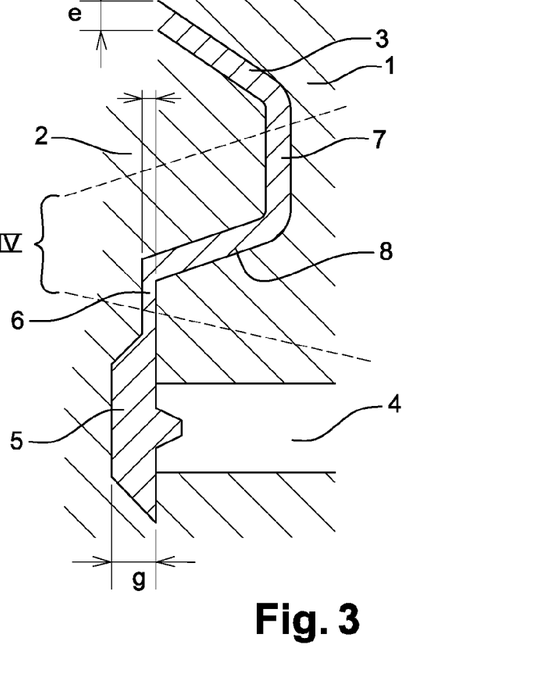
FIG. 3 is a cross-sectional view of a portion of a mould according to the invention for the same region II of the part shown on FIG. 1B.

On FIGS. 2 and 3, the components which are identical are designated by the same reference numbers.

FIG. 2 shows a cross-section of a portion of a mould according to the state of the art for the portion II of the part 20 of FIG. 1B, the mould being composed of a die and a punch. The cavity 3 of the mould is intended to receive the skin of polymer material which comes from the injection nozzle 4 and which will form the part. The cavity shown on the figure comprises several sections. The main section 7 is intended to form the part. It has a thickness e. It is contiguous to a channel 6 which forms a constriction and which has a thickness f less than the thickness e of the main section 7. The tank 5 is the section which receives the polymer material coming from the injection nozzle 4. The tank 5 has a large thickness g and the polymer material is homogenised therein.

FIG. 3 shows a cross-section of a portion of a mould according to the invention for the portion 22 of the part 20 of FIG. 1B. In this mould, the cavity comprises an additional section 8 contiguous to the main section 7 and intended to form an add-on. The additional section 8 has the same thickness e at the junction between the main section 7 and the additional section 8. The additional section 8 is arranged between the entry point of the polymer material in the cavity or injection point, shown by the end of the nozzle 4 and the main section 7.

Figure 4:
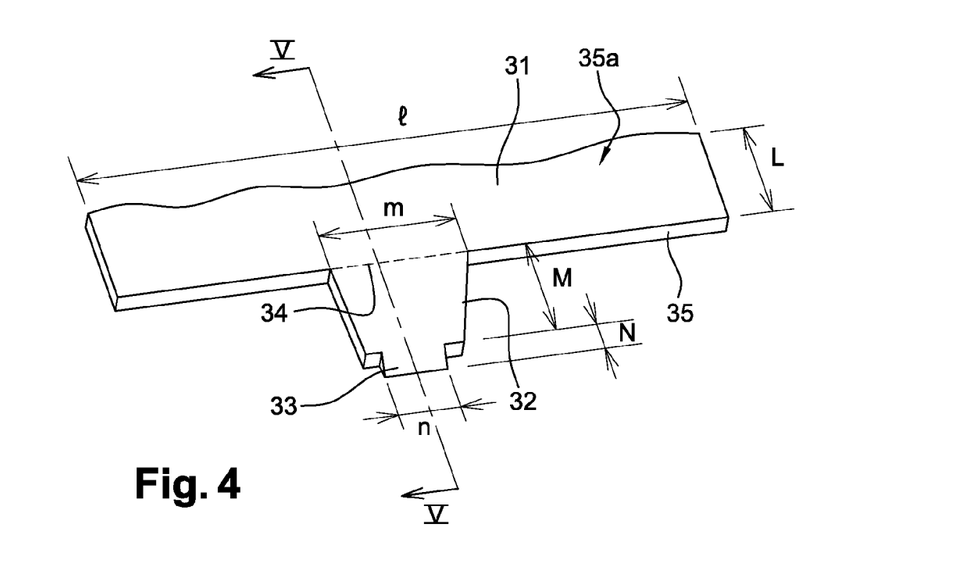
FIG. 4 is a flat representation of a part IV of a skin of polymer material according to the invention, after injection moulding in the mould shown on FIG. 3 and ejection.
Figure 5:
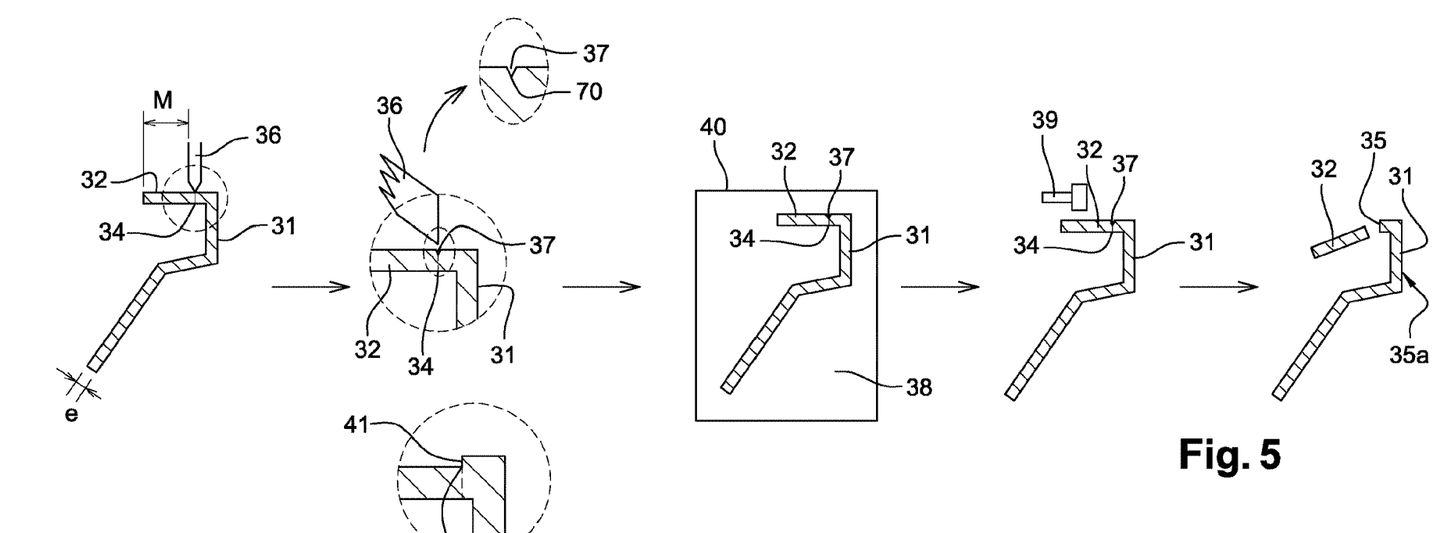
FIG. 5 shows cross-sectional views along V-V of the skin of polymer material of FIG. 4, at various phases of the cutting step according to an embodiment of the invention.
Figure 6:
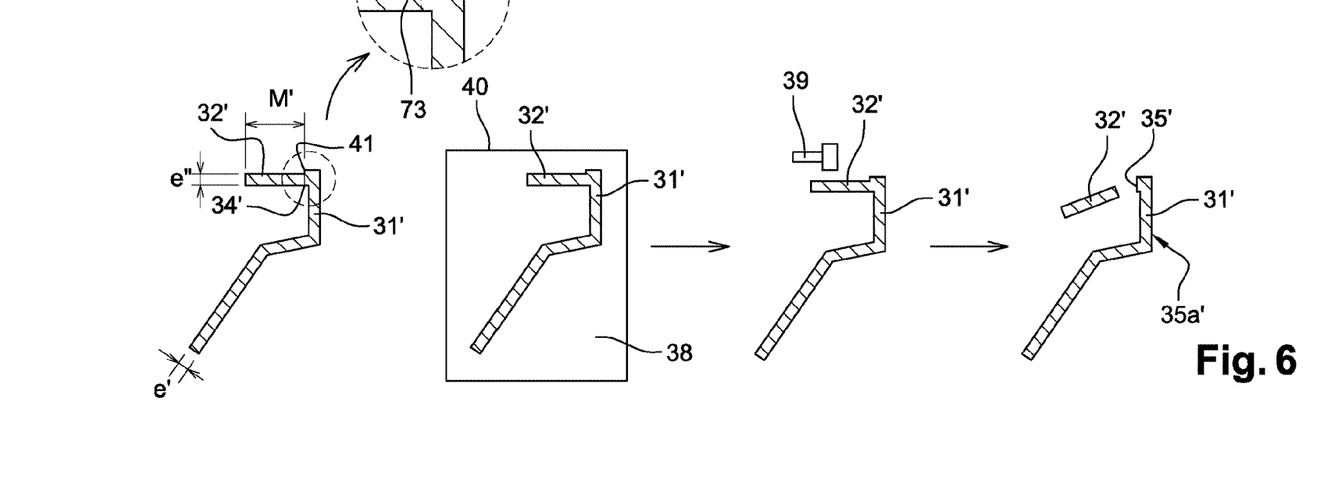
FIG. 6 shows cross-sectional views similar to those of FIG. 5, at various phases of the cutting step according to an embodiment of the invention.

In FIGS. 4 to 6, the components which are identical are designated by the same reference numbers.

FIG. 4 shows a flat representation of the part IV of a skin of polymer material, after injection moulding in the mould shown on FIG. 3 and ejection. The flat representation shows more clearly the pieces of the skin which are shown here in two dimensions, whereas in reality they form angles between them, as shown on FIG. 3. After injection in the mould, the polymer material is compacted then ejected according to conventional techniques not described here. The skin of polymer material has formed, in the main section 7 of the cavity, the part 31. It has formed in the additional section 8 of the cavity, the add-on 32 which is contiguous therewith. Lastly, it has formed, in the constriction 6 of the cavity, a constriction of large width or layer 33. The part 31 has a width l greater than that m of the add-on 32, itself substantially identical to the width n of the layer 33. The part 31 has a length L. The add-on 32 has a length M and the layer 33 has a length N. The skin of polymer material can, according to other embodiments of the invention, comprise several add-ons, each with or without a constriction such as a layer or a threshold. The skin of polymer material does not necessarily include a constriction. Line 34 shows the junction between the part 31 and the add-on 32. According to the invention, separation of the part and the add-on by cutting must be carried out along this line to form a portion of an edge 35, visible on FIG. 1B, of the part 31. At least one surface 35a of the part extending up to the edge 35 of the part is visible.

FIG. 5 shows cross-sectional views of the skin of polymer material of FIG. 4, at various phases of the cutting step according to an embodiment of the invention. For simplification purposes, the angles of FIG. 3 have not been respected.

The part 31 and the add-on 32, made of polypropylene, have a thickness e. The length M of the add-on is 20 mm. A cutter blade 36 is applied to the junction 34 between the part 31 and the add-on 32 in order to produce a groove 37, which forms at the junction the sharp angle 70, at the bottom of the groove, thereby creating an incipient break. The assembly formed by the part 31 and the add-on 32 is then introduced into a closed chamber 40 containing a conditioning atmosphere 38 at −22° C. at atmospheric pressure, in order to reduce the temperature of the junction to a temperature less than or equal to the embrittlement point of the polymer material. The assembly stays in the chamber for 24 hours. The temperature of the junction 34 is then less than or equal to the embrittlement point of the polymer material, and the add-on 32 is struck by a mass 39, thereby creating a mechanical break at the junction 34 between the part 31 and the add-on 32, in order to separate the part 31 and the add-on 32. The separation forms a portion of the edge 35 of the part. A "mass" means an impactor separator or hammer that can be guided to hit or press at the right place. The cut obtained is clean, with no bead and no roughness. At least the surface 35*a* of the part extending up to the edge 35 of the part is visible.

FIG. 6 shows cross-sectional views of a skin of polymer material similar to that of FIG. 4, at various phases of the cutting step according to an embodiment of the invention.

A part 31' and an add-on 32' are shown. The thickness e" of the additional section at the junction 34' between the part 31' and the add-on 32' is less than the thickness e' of the main section 31' at the junction. This difference in thickness creates a step 41. The difference in thickness extends along the entire length M' of the add-on 32'. The step 41 has a sharp angle 73. The sharp angle 73 was formed during the injection step, by using a cavity not shown in which the thickness at the junction of the additional section is less than the thickness at the junction of the main section.

Formation of the sharp angle 73 creates an incipient break at the junction between the part 31' and the add-on 32'. The assembly formed by the part 31' and the add-on 32' is then introduced into the closed chamber 40 containing the conditioning atmosphere 38. The assembly stays there for 24 hours, to reduce the temperature of the junction 34' to a temperature less than or equal to the embrittlement point of the polymer material. Afterwards, when the temperature of the junction is less than or equal to the embrittlement point of the polymer material, the add-on 32' is struck by the mass 39, thereby creating a mechanical break between the part 31' and the add-on 32'. This separates the part 31' and the add-on 32'. The separation forms a portion of an edge 35' of the part 31'. The cut obtained is clean, with no bead and no roughness. At least one surface 35*a'* of the part extending up to the edge 35' of the part is visible.

The chamber temperature can be lowered to reduce the time required for the junction to reach a temperature less than or equal to the embrittlement point of the polymer material.

Figures 7, 8, 9:
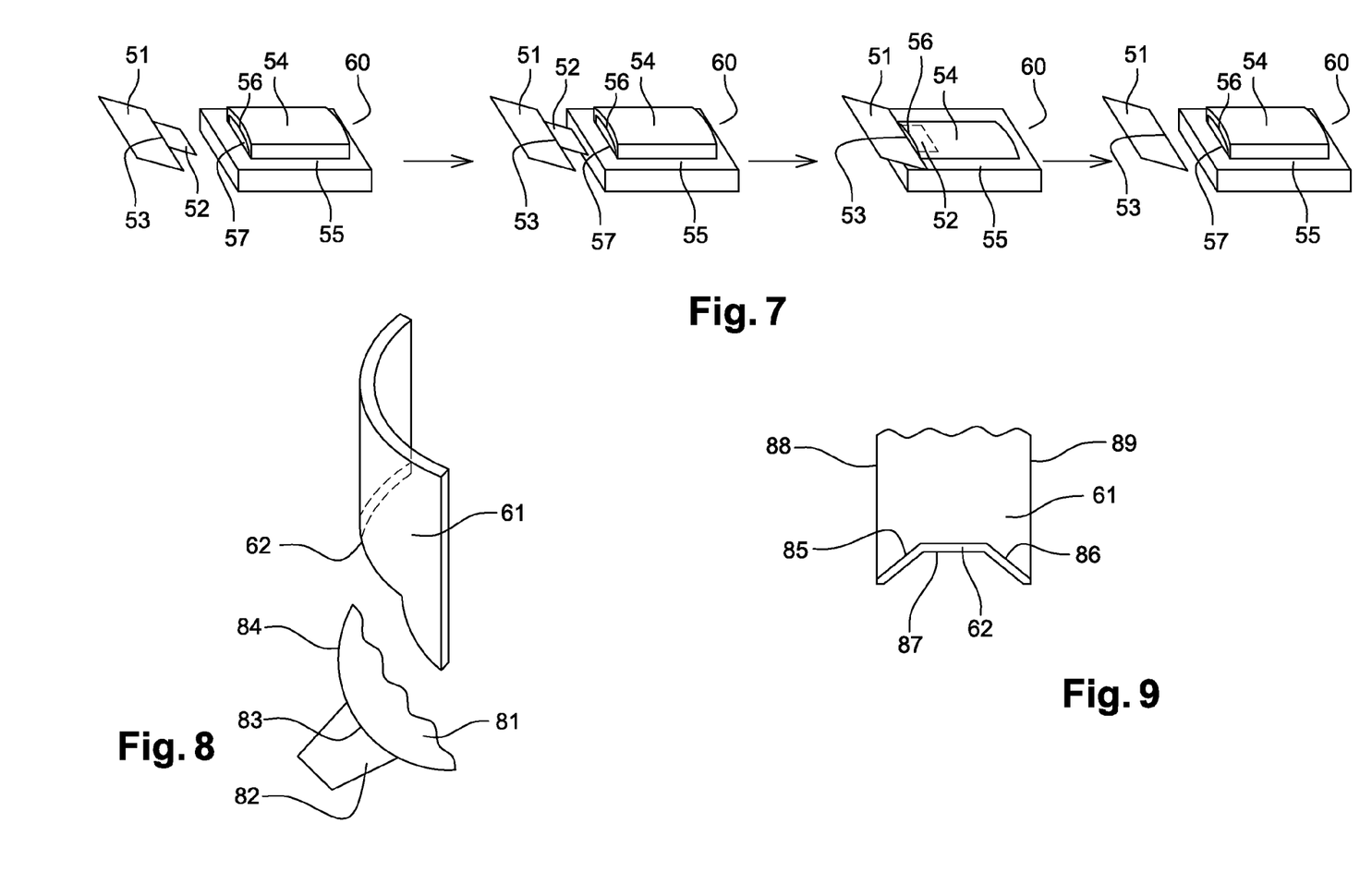
FIG. 7 shows a skin of polymer material at various phases of the cutting step according to an embodiment of the invention.
FIG. 8 is a perspective view of a blade and of a skin of polymer material, according to an embodiment of the invention.
FIG. 9 shows a top view of a blade according to an embodiment of the invention.

FIG. 7 shows a skin of polymer material similar to that of FIG. 4, at various phases of the cutting step according to an embodiment of the invention.

A part 51 and an add-on 52 are shown. Line 53 represents the junction between the part 51 and the add-on 52. A cutting device 60 is shown. It comprises a base 55 having a recess 57. The base is surmounted by a mobile arch 54 which comprises a blade-holder 56 section, or punch, equipped with a blade not shown. To separate the part 51 from the add-on 52, the assembly is positioned so that the junction line 53 is placed at the blade-holder 56 section of the arch 54, which positions the add-on 52 in the recess 57 of the base 55. The part 51 is separated from the add-on 52 by applying a downward pressure on the arch 54 to move it downwards, so as to slice the junction line 53 with the blade carried by the blade-holder 56, thereby separating the part 51 and the add-on 52 by cutting. Separation forms an edge of the part 51. The add-on remains at the recess 57 where it can be collected, for example by a plate provided for this purpose. At least one surface of the part extending up to the edge of the part is visible.

On FIGS. 8 and 9, the components which are identical are designated by the same reference numbers.

FIGS. 8 and 9 show a blade according to an embodiment of the invention, which can be mounted on the blade-holder of the cutting device shown on FIG. 7.

FIG. 8 shows a perspective view of a blade 61 having a sharp end 62. The blade 61 is arranged to separate the assembly of a part, of which a section 81 has been shown, and an add-on 82 along a junction 83 between them. The edge 84 of the part, which includes the junction 83, is curved. It follows a portion of a curve. The blade 61 has the same curvature, in order to obtain a cut along the same curve. The blade 61 is movable in translation with the arch 54.

FIG. 9 is a partial side elevation view of the blade 61 and its sharp end 62. The sharp end 62 has, in the width of the blade, a shape consisting of three line segments. The central segment 87 is perpendicular to the edges 88 and 89 of the blade 61. The segments 85 and 86 each form an acute angle with respectively the edges 88 and 89 of the blade 61. Thus, the sharp end of the blade has two inclined segments, so that all the force exerted on the blade is concentrated on a reduced contact line, which increases the cutting efficiency. The specific shape helps to guide the blade as it moves down in contact with the part to be cut. The shape comprising two inclined segments favours the guillotine effect. The blade is flexible and thin like a cutter blade.

The cut obtained is clean, with no bead and no roughness. At least one surface of the part extending up to the edge 84 of the part is visible.

The invention is not limited to the embodiments described and other embodiments will be clearly apparent to those skilled in the art.

Using this method, it is in particular possible to manufacture parts made of polymer materials other than those used in the embodiments described.

Parts other than spoilers can also be manufactured, such as door panels, bonnets, tailgates, foot-steps, etc. In addition, the spoilers manufactured according to the method are not limited to those fitted on a frame of an opening element. The spoiler manufactured can in fact be attached directly to the body. In addition, the spoilers manufactured according to the method are not necessarily bonded. They can be welded.

Other cutting techniques can be used to separate the part from the add-on.

The cutting techniques can also be combined. For example, the cutting technique by creating a groove can be carried out on an assembly of a part and an add-on forming a step, the step being used to guide the blade.

Other methods can also be used to reduce the temperature of the junction between the part and the add-on.

What is claimed is:

1. A method for obtaining a motor vehicle part having at least one visible surface extending up to a portion of an edge of the part, the part being formed by a skin of a polymer material, the thickness of which is significantly smaller than other dimensions of the skin, the method comprising the steps of:

injecting the polymer material into a mould comprising a cavity in at least two contiguous sections, the at least two contiguous sections comprising a main section for forming the part and at least one additional section for forming an add-on for the part, the additional section extending over a length ranging from 10 mm to 30 mm, the thickness of the at least one additional section at a junction with the main section being at most equal to the thickness at the junction of the main section and at least equal to the thickness at the junction of the main section decreased by 0.5 mm, and the at least one additional section being arranged between an entry point of the polymer material into the cavity and the main section;

separating the part and the add-on by cutting to form said portion of an edge of the part, wherein cutting is carried out with a position tolerance with respect to the junction of less than 0.5 mm and a cut obtained has no bead and no roughness;

creating an incipient break at the junction between the part and the add-on and reducing the temperature of the junction to a temperature less than or equal to the embrittlement point of the polymer material; and then once the temperature of the junction between the part and the add-on is less than or equal to the embrittlement point of the polymer material, mechanically breaking at the junction, wherein the step of creating an incipient break at the junction between the part and the add-on consists of forming a sharp angle at the surface of the junction, and wherein the sharp angle is formed by creating, at the junction between the part and the add-on, a groove using a blade after ejecting the part and the add-on from the mould.

2. The method for obtaining a motor vehicle part according to claim 1, wherein the sharp angle is formed during the injection step, by using a cavity in which the thickness at the junction of the at least one additional section is less than the thickness at the junction of the main section, by forming a step at the junction between the part and the add-on.

3. The method for obtaining a motor vehicle part according to claim 1, wherein cutting is carried out with a position tolerance with respect to the junction of less than or equal to 0.1 mm and the cut obtained has no bead and no roughness.

4. The method for obtaining a motor vehicle part according to claim 1, wherein cutting is carried out using a blade movable in translation in a cutting direction which has a sharp end at least partially inclined with respect to the cutting direction and which is arranged to separate the assembly of the part and the add-on along the junction therebetween under the effect of a downward pressure.

5. The method for obtaining a motor vehicle part according to claim 4, wherein the sharp end at least partially inclined consists of three segments, the three segments being one central segment and two side segments which each intersect an edge of the blade and each of the side segments forms an acute angle with the cutting direction.

6. A method for obtaining an assembly of a motor vehicle part and a frame supporting the part, the part having at least one visible surface extending up to an edge of the part, the method comprising the steps of:

obtaining a motor vehicle part according to the method for obtaining a motor vehicle part according to claim 1; and assembling the skin on the frame supporting the part.

* * * * *